United States Patent [19]

Schmadel et al.

[11] 4,268,116

[45] May 19, 1981

[54] METHOD AND APPARATUS FOR RADIANT ENERGY MODULATION IN OPTICAL FIBERS

[75] Inventors: Donald Schmadel; William H. Culver; Gordon Gould, all of Gaithersburg, Md.

[73] Assignee: Optelecom Incorporated, Gaithersburg, Md.

[21] Appl. No.: 88,579

[22] Filed: Oct. 26, 1979

[51] Int. Cl.³ .................. G02B 5/14; G02F 1/11; G02F 1/29
[52] U.S. Cl. .................. 350/96.29; 350/96.19; 350/373; 350/358; 350/359
[58] Field of Search .............. 350/96.19, 96.29, 96.13, 350/96.14, 96.15, 149, 358, 359

[56] References Cited

U.S. PATENT DOCUMENTS

| | | | |
|---|---|---|---|
| 3,625,589 | 12/1971 | Snitzer | 350/96.29 |
| 3,645,603 | 2/1972 | Smith | 350/96.29 |
| 3,819,250 | 6/1974 | Kibler | 350/96.29 |
| 3,931,518 | 1/1976 | Miller | 350/96.15 |
| 4,006,963 | 2/1977 | Baues et al. | 350/96.14 |
| 4,039,249 | 8/1977 | Kaminow et al. | 350/96.14 |
| 4,068,191 | 1/1978 | Zemon et al. | 350/96.29 |
| 4,086,484 | 4/1978 | Steensma | 350/96.29 |
| 4,118,676 | 10/1978 | Redman | 350/96.30 |
| 4,128,299 | 12/1978 | Maher | 350/96.13 |

OTHER PUBLICATIONS

PCT/US78/00198, to P. Macedo et al., Jun. 1979.
F. Gfelle et al., "Modulator & Tap for Optical Fiber Systems," in *IBM Tech. Disc. Bull.*, vol. 21, No. 5, Oct. 1978.
Kawasaki et al., "Narrow-Band Bragg Reflectors in Optical Fibers," in *Optics Letts.*, vol. 3, No. 2, Aug. 1978, pp. 66–68.
J. A. Bucaro et al., "Measurement of Sensitivity of Optical Fibers for Acoustic Detection," in *Applied Optics*, vol. 18, No. 6, Mar. 1979.
P. G. Cielo, "Fiber Optic Hydrophone:Improved Strain Configuration & Environmental Noise Protection," in *Applied Optics*, vol. 18, No. 17, Sep. 1979.
A. Warner et al., "Miniature Acoustooptic Modulators for Infrared Optical Communications," IEEE Jour. Quantum Electronics, vol. QE-O Jun. 73.
Jeunhomme et al., "Directional Coupler for Multimode Optical Fibers," *Applied Physics Letts.*, vol. 29, No. 8, Oct. 1976.
H. Hsu et al., "Single Mode Optical Fiber Pickoff Coupler," *Applied Optics*, vol. 15, No. 10, Oct. 1976.

*Primary Examiner*—Stewart J. Levy
*Attorney, Agent, or Firm*—Kerkam, Stowell, Kondracki & Clarke

[57] ABSTRACT

Radiant energy is caused to modulate in phase and frequency in a single mode optical fiber by means of a relatively movable, spatially periodic perturbation.

31 Claims, 24 Drawing Figures

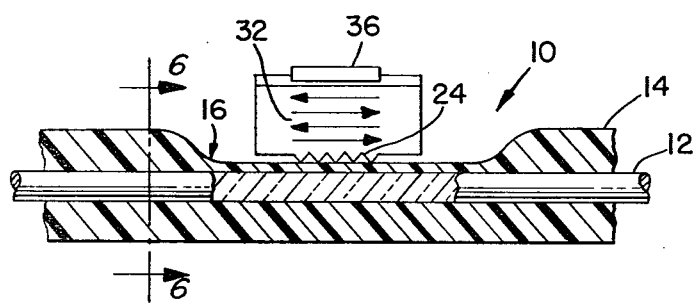
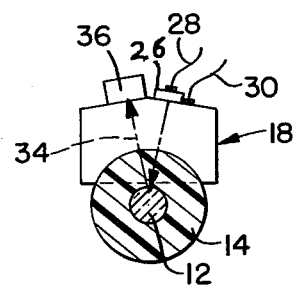
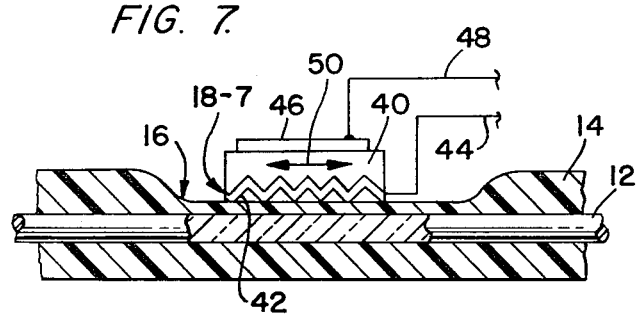
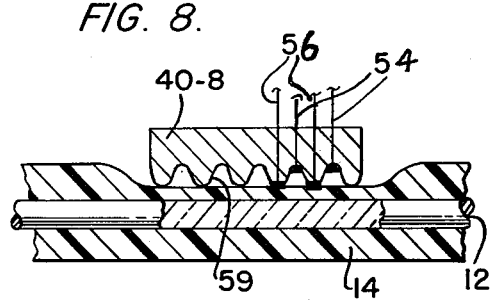
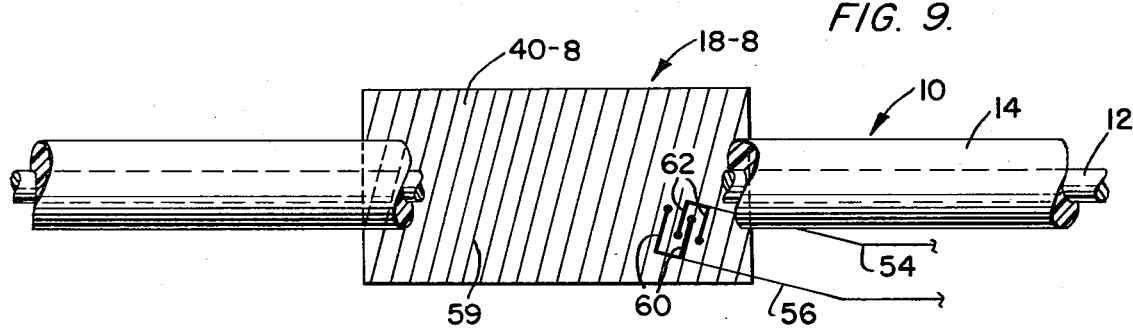
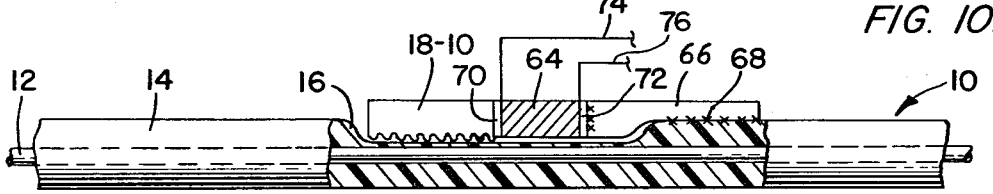
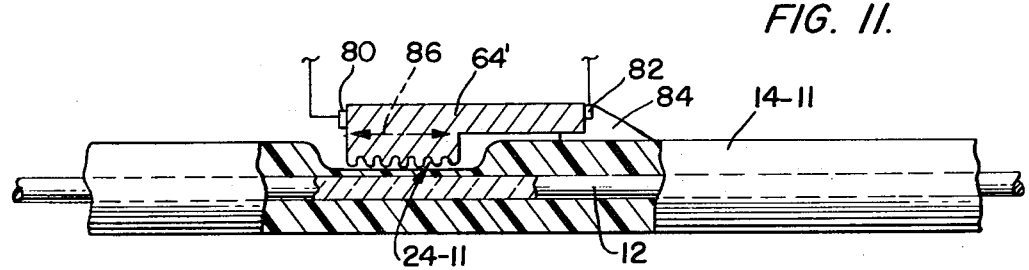

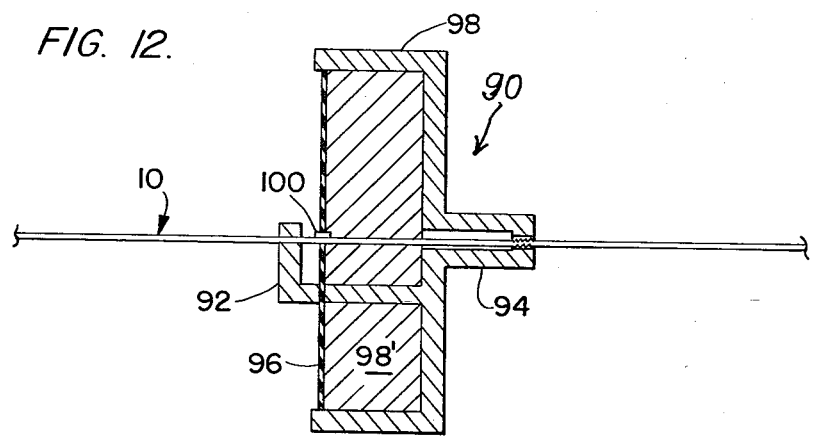
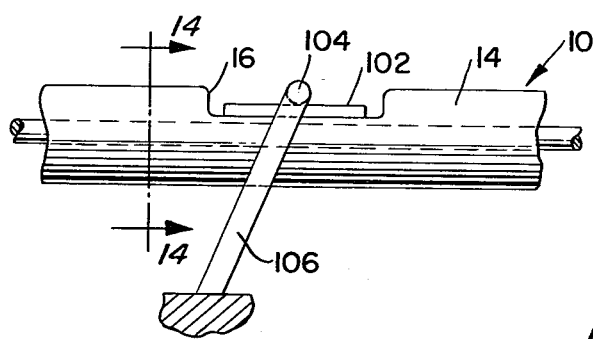
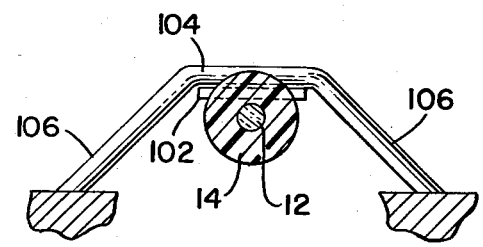
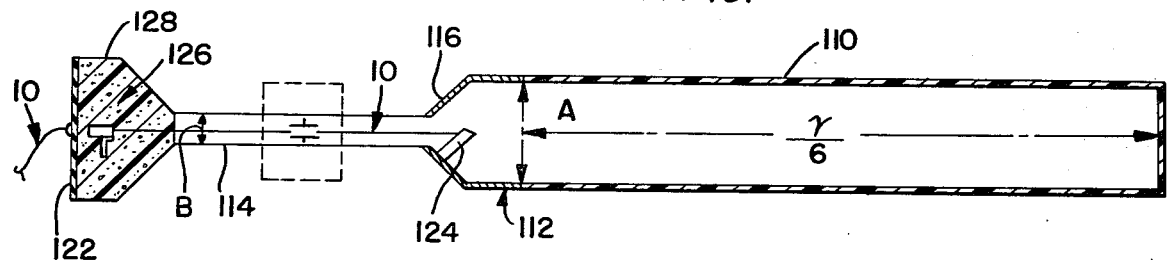
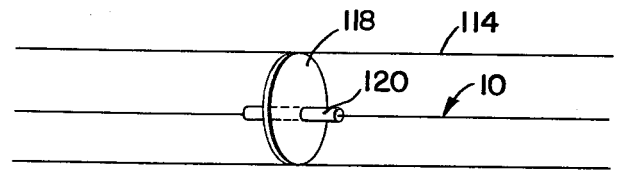
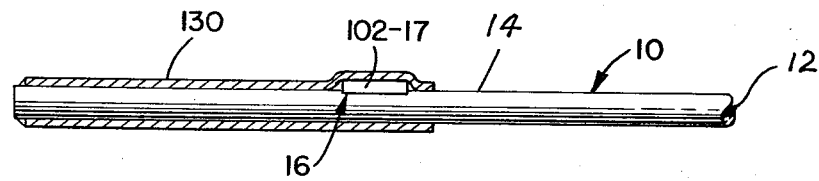

METHOD AND APPARATUS FOR RADIANT ENERGY MODULATION IN OPTICAL FIBERS

DESCRIPTION

Technical Field

The invention relates to the field of radiant energy modulation in single mode optical fibers.

Background of Prior Art

The prior art for either phase modulation or frequency modulation of, for example, light in an optical fiber utilized the acousto-optic effect wherein the signal to be imposed onto the light carried in the fiber is used to mechanically or acoustically excite the fiber. This mechanical or acoustical excitation gives rise to a variation in the optical index of the core of the fiber. The result is a variation in the optical path length for the light traveling in the fiber. This light is therefore modulated in phase and frequency by the signal. For glass fibers the change in optical index is quite small for a given energy of mechanical or acoustical excitation. In order to obtain sufficient modulation, this necessitates either high signal energy or long interaction lengths where the interaction length is the length of fiber which must be acoustically excited wherein modulation occurs. The sensitivity of optical fibers to direct acoustical modulation is discussed by J. A. Bucaro in *Applied Optics;* Vol. 18 No. 6; Mar. 15, 1979. A device specifically utilizing this effect was built by Arthur W. Warner and Douglas A. Pinnow, and is reported in abstract in the *IEEE Journal of Quantum Electronics;* Vol. QE-O; pp. 659–660; June, 1973.

The invention uses a novel type of movable, spatially periodic perturbation in the wall of a single mode optical fiber waveguide to achieve modulation. The effect of a stationary spatially periodic perturbation in a rectangular waveguide is discussed by Dietrich Marcuse in *Bell System Technical Journal;* Vol. 48, pp. 3233–3242; December, 1969. The effect of another type of stationary, spatially periodic perturbation is discussed by B. S. Kawasiki et al in *Optic Letters;* Vol. 3, No. 2; August, 1978.

In each case, the spatially periodic perturbations were forced to be stationary by the manner in which they were achieved.

BRIEF SUMMARY OF INVENTION

The invention causes modulation in a signal mode optical fiber by means of a movable, spatially periodic perturbation. The spatially periodic perturbation is used to reflect a narrow band of radiant energy wavelength which by virtue of the motion of the spatially periodic perturbation is modulated in phase and/or frequency. The invention causes the spatially periodic perturbation by means of an optical grating placed near the core of a single mode fiber. The spatially periodic perturbation is moved by moving the optical grating with respect to the fiber.

The invention provides many means of coupling the motion of the optical grating of the fiber to various types of signals or conditions. These means include coupling to both high and low frequency signals including static signals or conditions. These means allow coupling for electrical, electro-magnetic, magnetic and acoustical signals and for thermal levels and chemical conditions and humidity.

The invention provides frequency multiplexing many signals into the same fiber using multi-wavelength radiant energy in the fiber and adjusting the spatial period of each spatially periodic perturbation to interact only with a particular different wavelength of the multi-wavelength energy.

The invention provides for time division multiplexing many signals into the same single mode fiber by using pulsed, for example, light in the fiber and locating various spatially periodic perturbations at known distances along the fiber. Though various spatially periodic perturbations may interact with the same wavelength, the reflection of the pulsed radiant energy will arrive at the source at different times. The signals from each spatially periodic perturbation can be sorted accordingly.

The invention provides for the construction of an optical demodulation system entirely within the single mode fiber by the placement of a second optical grating along the fiber. The optical demodulation system operates somewhat as a Fabry Perot interferometer and allows the first stage of optical frequency or phase demodulation to occur as near the signal input as is desired, thus minimizing thermal and mechanical noise and eliminating the need for a separate and costly interferometric system.

The invention includes a detection system which spectrally locates the reflection peaks of the spatially periodic perturbations.

The invention also includes a detection system to be used with the optical demodulation system above, the output of which is the spectral location of the optical resonances of the interferometer thus minimizing the effect of amplitude variations of the, for example, light source.

The invention may be defined as including:
means for modulating radiant energy in a single mode clad optical fiber comprising a clad single mode optical fiber having a modulation control zone where the cladding is partially removed or formed with a decreased thickness relative to the remainder of the cladding; an optical grating; means mounting the optical grating in the control zone with the crests of the optical grating positioned generally normal to the optical fiber, and means for longitudinally displacing the optical grating relative to the optical fiber to cause a narrow band of the radiant energy in the optical fiber to be modulated in phase and/or frequency.

The invention also includes a method of modulating radiant energy in phase and/or frequency in a single mode optical fiber comprising removing a portion of the cladding from a single mode optical fiber having a cladding about the fiber, mounting an optical grating on said fiber in the zone where the portion of the cladding has been removed with the crests of the grating oriented generally normal to the longitudinal axis of the optical fiber, and causing relative longitudinal displacement of the grating relative to the longitudinal axis of the fiber.

BRIEF DESCRIPTION OF DRAWINGS

FIG. 5 is a view like FIG. 1 of another form of the present invention;

FIG. 6 is an end view of the structures shown in FIG. 5;

FIG. 7 is a view like FIG. 5 of another form of the present invention;

FIG. 8 is a view like FIG. 1 of still another form of the present invention;

FIG. 9 is a bottom plan view of the structures shown in FIG. 8;

FIG. 10 is a view like FIG. 1 of still another form of the present invention;

FIG. 11 is a view like FIG. 1 of another form of the present invention;

FIG. 12 is a diagrammatic sectional view of the present invention coupled to a microphone;

FIG. 13 illustrates a system for holding a thin film grating from radial displacement;

FIG. 14 is an end view of the structures illustrated in FIG. 13;

FIG. 15 illustrates the system of the present invention coupled to a hydrophone;

FIG. 16 is an enlarged view of a portion of the structures illustrated in FIG. 15;

FIG. 17 illustrates the application of the present invention wherein the spatially periodic perturbations are moved by thermal expansion or contraction;

FIG. 21b is a diagrammatic bottom plan view of the structures shown in FIG. 21a;

FIG. 22b is a diagrammatic bottom plan view of the structures shown in FIG. 22a.

DETAILED DESCRIPTION OF INVENTION

The invention will now be described in detail wherein the single mode optical fiber is employed as a light pipe. However, it will be understood that other electromagnetic radiant energy rays could be employed with the single mode fiber such as infrared.

A single mode optical fiber is a fiber constructed so as to allow only the lowest order mode to propagate. This lowest order mode for some single mode fiber constructions is two fold degenerate. In these cases the lowest order mode contains two states of propagation which are distinguished by the fact that their polarizations are mutually perpendicular.

As hereinbefore disclosed, the invention causes a movable spatially periodic perturbation in the wall of a single mode optical fiber by using an optical grating. The optical grating is placed near enough to the core of the fiber to interact with the evanescent or non-radiation fields of the light which is traveling in the fiber. In cases where the single mode optical fiber has a cladding too thick to permit placement of the grating near the core, the clad may be partially removed by grinding or otherwise.

Figure 1:
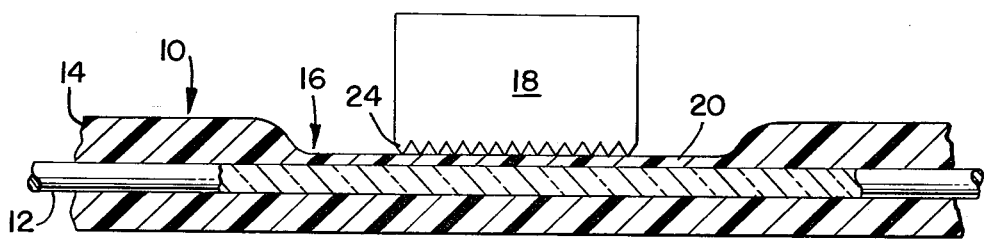
FIG. 1 is an enlarged partially sectional view in elevation of a single mode fiber in association with an optical grating constructed in accordance with the teachings of the present invention.
Figure 2:
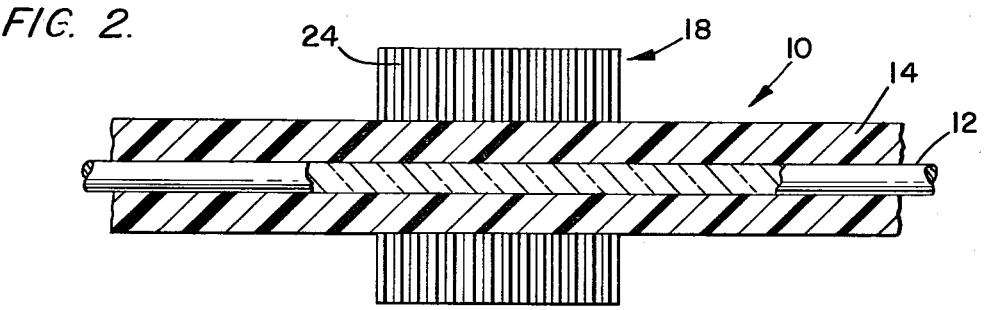
FIG. 2 is a bottom planned view of the structures illustrated in FIG. 1.

In FIGS. 1 and 2, 10 generally designates a single mode optical fiber having a light transmitting core 12 of, for example, plastic, glass or quartz, and a lower index of refraction cladding 14, of glass or plastic. The cladding 14 is illustrated as being partially removed by, for example, grinding as at 16. In the ground zone 16 is mounted at optical grating generally designated 18. The optical grating 18 consists of periodic alternation of teeth and grooves 24.

In such a system, the wall 20, in the ground zone 16 surrounding the core 12 of the single mode fiber near the optical grating 18 consists of a thin layer of glass, or plastic 20 and a periodic alternation of teeth and grooves 24 to thus provide a spatially periodic perturbation of the optical index of the wall surrounding the core of the fiber. The evanescent field of the light traveling in the fiber will be reflected back to the source by this spatially periodic perturbation when the period is near an integral multiple of $\frac{1}{2}\lambda$. Such a phenomenon, called Bragg reflection, is illustrated graphically in FIG. 3.

Figure 3:
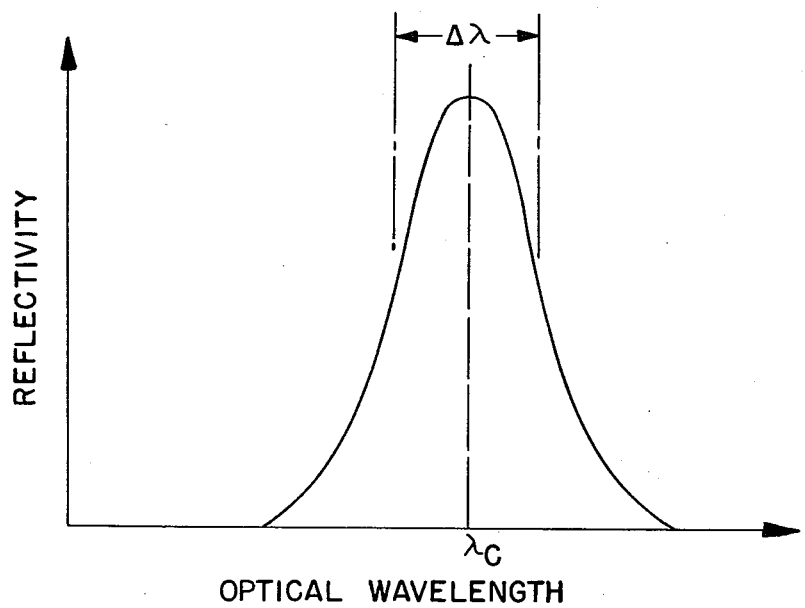
FIG. 3 is a graphic illustration illustrating the intensity of reflected light vs wavelength for a spatially periodic perturbation.

The graph, FIG. 3, shows the intensity of reflected light vs wavelength for a particular spatially periodic perturbation. The center $\lambda c$ of the wavelength band reflected is:

$$\lambda c = (ND/2)$$

where
 D is the length of the spatial period;
 N is effective optical index for the single mode fiber.
The width of this band of wavelengths is given by:

$$\Delta\lambda = 2Nl$$

where
 l = length of fiber in contact with the grating.
The reflectivity of the spatially periodic perturbation within this band of wavelengths may be increased or decreased by a common factor by placing the grating nearer or further from the core and by using grating materials of higher or lower optical indices of refraction. Further, because the spatially periodic perturbation is caused by a periodic perturbation in the optical index of the wall of a single mode fiber, the grating may be any material having a surface with a periodic variation in its optical index. Holographic film grating is such a material.

Figure 21A:
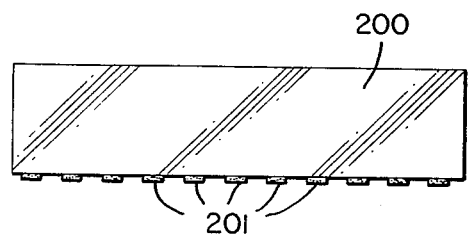
FIG. 21a is a side elevational view of another form of the present invention.
Figure 21B:
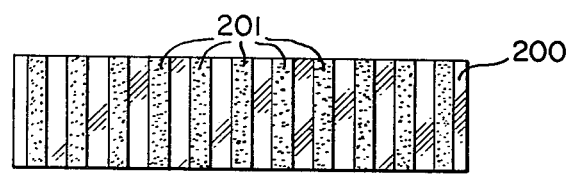
Figure 22A:
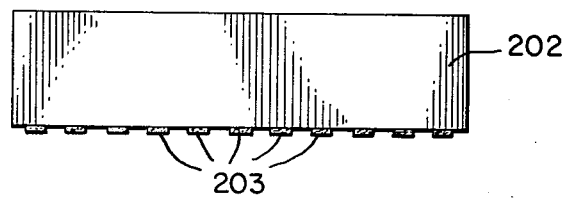
FIG. 22a is a view like FIG. 21a of still another form of a modulation device of the present invention.
Figure 22B:
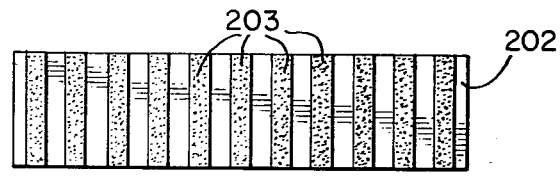

The invention allows also for a spatially periodic perturbation of conductivity. In such a case the invention places near the fiber core a surface of periodically varying conductivity as in FIGS. 21a and 21b. The slab marked 200 is a nonconducting material such as glass or plastic, upon which are evaporated conductive strips 201, which could be, for example, metal. The slab is oriented near the fiber core so the metal strips are generally perpendicular to the fiber optic axis. Another means for establishing the spatially periodic perturbation of conductivity is to use a slab of material, 202, in FIGS. 22a and 22b, which is conductive and upon which are evaporated strips, 203, of nonconductive material, e.g., $S_iO$. Such slabs as in FIGS. 21a and 21b, will be called "optical gratings" or "gratings". The invention provides the following means for obtaining a particular spatial period from a grating having a shorter spatial period.

Figure 4:
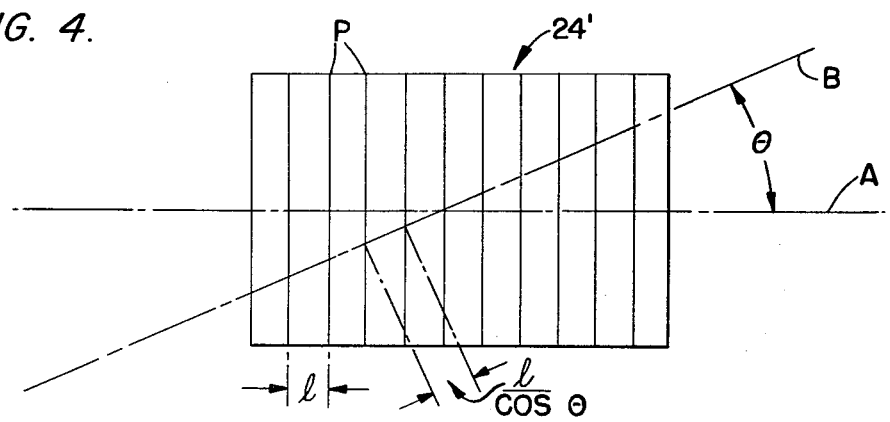
FIG. 4 illustrates a grating surface greatly magnified.

FIG. 4 illustrates a grating surface 24' greatly magnified. The lines marked "P" are lines of constant refractive index, or conductivity, along the grating surface. The spatial variation is perpendicular to these lines which are spaced each one period apart. Various single mode fiber orientations relative to the surface 24' are depicted by means of a dashed line representing the single mode fiber optical axis. For orientation A, represented by the dashed line marked "A" perpendicular to lines P, the spatial period is as seen from the drawing equal to 1. The spatial period for the orientation marked "B" is $1/\cos\theta$ which is greater than 1, the 'normal' spatial period of the grating, where $\theta$ is the angle between the optical axis of the single mode fiber in orientation A, which is perpendicular to the lines of equal optical index of the surface, and orientation B.

A spatially periodic perturbation so constructed can be moved relative to the fiber simply by moving the grating relative to the fiber. The invention couples the motion or position of the grating as measured along the optic axis of the single mode fiber to an input signal or parameter. The result is reflection of a particular wavelength band of the light which is traveling in the fiber by a spatially periodic perturbation which is moving or positioned in response to an input signal or parameter.

The moving spatially periodic perturbation will modulate the frequency of the reflected light consistent with the relativistic Doppler shift as specified in the subject matter of the physical principle of Special Relativity.

In cases such that the position of the grating as measured along the optical axis of the single mode fiber is coupled to an input parameter, then reflection of the wavelength band will occur at various locations along the single mode fiber as a function of this input parameter. These changes in location of the spatially periodic perturbation as caused by the changes in location of the grating cause changes in the optical path length for light traveling in the single mode fiber to the spatially periodic perturbation, being reflected, and traveling back to the source. The change in optical path length modulates the phase of the reflected light relative to the phase of the source of the light. Calculations reveal that such a system, i.e., moving the grating to achieve modulation requires much less signal energy than the previous state of the art of fiber modulation systems.

The invention contains several means for coupling the motion or position of the grating to an input signal or parameter. FIGS. 5 and 6 illustrate a means which acoustically couples a shear wave transducer 26 to the grating 18. An electric input signal via electrodes 28 and 30 activates the shear-mode transducer 26, thus causing an acoustical shear wave in the plane containing the teeth 24 of the grating 18. An acoustical shear wave is characterized by material motion shown by arrows 32 perpendicular to its direction of propagation shown by arrows 34. The invention arranges the shear-mode transducer 26 so as to polarize the material motion parallel to the optic axis of the single mode fiber which is also parallel to the direction of spatial periodicity of the spatially periodic perturbation. The spatially periodic perturbation therefore moves parallel to the optic axis of the single mode fiber as caused by the motion of the teeth of the grating which is in response to the electric input signal to the shear-mode transducer. An absorber 36, consisting of a block of a material accoustically matched and attached to the top of the element carrying the grating 18 reduces unwanted reflection of the shear wave propagation.

It is further understood that the grating may be an integral part of the transducer, that is, the grating itself may be constructed from a piezoelectric material as, for example, in FIGS. 7, 8 and 9.

In FIG. 7, the piezoelectric block 40 is provided with grating 18-7 on its lower surface, which grating is metallized as at 42 to provide one of the electrodes and is provided with an electrical lead 44. The other electrode 46 on the top surface of the piezoelectric crystal 40 is connected to lead 48. Arrow 50 depicts the direction of motion of the grating 18-7 in respect to the axis of the core fiber 12 of the single mode optical fiber 10.

In FIGS. 8 and 9, the grating 18-8 of the piezoelectric transducer chip 40-8 illustrates a form of the invention where the teeth and grooves or crests and troughs of the grating are formed by a surface acoustic wave indicated by lines 59. In such a case, a change in frequency of the input signal via conductors 54-56 to the network of electrodes 60-62 causes a change in the separation of the crests and troughs of the grating formed by the surface acoustical wave. The electrodes 60-62 can be formed by metallizing portions of the lower surface of the transducer chip 40-8. The wavelength band, that such a grating would reflect, would shift in wavelength in direct response to the change in frequency of the input signal. The input frequency to the electrodes 60-62 can be coupled to an input signal or parameter thus modulating the frequency of the reflected wavelength band center (FIG. 3). In such cases the term single mode optical fiber will also include multimode optical fibers which only allow modes to propagate with propagation constants nearly equal so as to maintain optical coherence over the length of the grating. The invention detects the input signal frequency by tracking the spectral location of the reflected wavelength band using an optical spectrometer. In cases wherein one may control the frequency of the input signal, such a device as depicted in FIG. 9 may be used as a tunable filter to select various wavelength bands of light.

FIG. 10 depicts a second means as provided by the invention of coupling an electrical input signal to the motion or position of the grating. This means employs a longitudinal-mode piezoelectric transducer 64 with one side bonded to the grating 18-10 and the opposite side bonded stationary relative to the single mode fiber arm 66 cemented as at 68 to the cladding 14 of the single mode optical fiber 10. Opposite sides of the longitudinal-mode transducer 64 are metallized as at 70 and 72 to which are attached electrical leads 74 and 76. For low frequency electrical signals coupled to the transducer 64, the transducer will expand and contract in the direction of the electric field. Since the side opposite the grating 18-10 is restrained relative to the single mode fiber, the grating teeth and grooves will move with a component of the velocity vector parallel to the optical axis of the single mode fiber in response to the input signal.

The invention includes the adaptation of the means illustrated in FIG. 10 wherein the grating is an integral part of the transducer as, for example, that particular case depicted in FIG. 11.

In FIG. 11, 64' is a longitudinal mode piezoelectric transducer provided with end electrodes 80 and 82. The lower face of the transducer 64' is provided with grating 24-11 and the end of the transducer adjacent electrode 82 is cemented to the cladding 14-11 of the single mode optical fiber assembly 10 as at 84. Arrow 86 depicts the motion of the grating in response to an oscillating electrical input to the electrodes 80 and 82.

In all means wherein piezoelectric transducers are employed the invention provides for the substitution of the piezoelectric transducer with a magnetostrictive transducer and a solenoid with a movable core when the purpose is to move or position the grating. Further, the invention provides a means of coupling to magnetic signals directly by substituting the piezoelectric transducer with a magnetostrictive material which will produce motion or effect the change of the position of the grating when exposed directly to the magnetic signal or condition. The invention also provides for the direct sensing of electrical fields and electro-magnetic fields with piezoelectric transducers. In such case, the piezoelectric material may be exposed directly to the field. The resulting motion or change of shape of the material will move or position the grating. The invention provides for the addition of antenna electrodes to gather a greater portion of energy available when sensing weak fields. The electrodes then electrically conduct this energy to the piezoelectric transducer. This results in an antenna system which connects to the receiver or amplifier by means of an optical fiber thus eliminating electrical noise in the antenna to receiver link and the danger of lightning striking the antenna and being conducted into the receiver or amplifier.

A third means of coupling the motion or position of the grating to a signal relates to signals which are acoustical. In such cases, the invention couples the acoustical signal directly to the grating as, for example, that shown in FIG. 12. In FIG. 12, 90 generally designates a microphone system including a single mode optical fiber 10 cemented in front and rear portions 92 and 94 of a microphone 90. The fiber also passes through an opening in the microphone diaphragm 96 secured to the wall 98 of the microphone. A grating 100 is carried by the diaphragm 96 at a position such that the grating will oscillate upon movement of the diaphragm 96 sensing acoustical waves, causing it to move with a velocity component parallel to the single mode fiber axis. The diaphragm is mechanically connected to the grating thus causing motion of the grating in response to the acoustical signals. Between wall 98 and the diaphragm 96 is a suitable absorber 98' such as foam plastic. In cases of low energy acoustical signals, the invention provides the use of low mass gratings and low mass grating suspension means such as spider web or quartz fibers as depicted in FIGS. 13 and 14.

In FIGS. 13 and 14 there is illustrated a single mode optical fiber 10 having a portion of the cladding 14 removed as at 16. In the depression formed at 16 is a thin film grating 102. The thin film grating is held in close optical relation to the core 12 of the optical fiber 10 by a quartz fiber or web generally denoted 104. The extended ends 106 of the glass fiber 104 are secured to stationary means as illustrated.

In cases of detecting acoustic waves in water, the invention provides the hydroacoustic antenna shown in FIG. 15 and in part in FIG. 16.

A cylindrical low impedance membrane 110, $\Lambda/6$ in length, where $\Lambda$ is the shortest acoustic wavelength of interest, contains a gas, such as $H_e$ or air, and acts as a diaphragm coupling the oceans acoustic signal into the gas. The signal now in the gas will pass into the rigid cylinder 112 of diameter A and then into the rigid tube 114 of diameter B. The junction of these two tubes is "impedance transformer" and resembles a funnel 116.

The funnel-like surface will impedance match the gas filled rigid tube in the membrane to the ocean if:

$$(\Omega g)/(\Omega W) = (\pi B^2)/(\pi A[\Lambda/6])$$

where $\Omega g$ = the specific acoustical impedance of the gas.

$\Omega W$ = the specific acoustical impedance of the water.

and A and B are the diameters of the two tubes as shown in FIG. 15. Once the acoustical wave has entered the small rigid tube it will strike the low mass diaphragm or sail 118, for example, a colloidal film which is bonded to a low mass grating 120, FIG. 16. The grating will move in response to the acoustical signal.

The single mode fiber 10 is rigidly attached within tube 114 at end plate 122. Where the fiber passes through an opening in the end plate 122. The other end of the fiber 10 is rigidly attached to an attachment block 124 secured in the impedance transformer section 116.

Suitable acoustic absorption material 126 fills the end zone 128 of the device to reduce the reflection of acoustical waves from the end 122 of the hydrophone which could cause the sail 118 to move and in turn to oscillate the grating 120.

A fourth means provided by the invention for coupling the grating to input signals relates to thermal measurements. Such a means mechanically couples the position of the grating to a material which may change in shape or size under the influence of thermal changes.

FIG. 17 illustrates a particular case wherein the temperature sensitive material is in the form of a tube and is collapsed around the single mode fiber and grating. In FIG. 17 the single mode optical fiber is designated 10, and a portion of the cladding 14 is in part removed in zone 16. In the zone 16 is mounted a thin film grid or grating 102-17 such as the grating 102 illustrated in FIG. 13.

Shrunk about a longitudinal section of the fiber 10, including the zone 16, is a thermally expandable tube 130 whereby thermal expansion and contraction of the length of the tube causes a narrow band of light to be modulated within the fiber 10. In such cases, the grating will move an amount equal to the difference in the thermal expansions of the single mode fiber and the tube material.

The invention further provides a means employing the grating itself as the material used to change shape or size under the influence of thermal changes. In such a means, a change in the size of the grating will change the spatial period of the spatially periodic perturbation by a proportional amount thus spectrally shifting the reflected wavelength band of the spatially periodic perturbation. Detection for such a means amounts to obtaining a spectral analysis of the light reflected by the spatially periodic perturbation and measuring the change in wavelength $\Delta\lambda_c$ of the center wavelength, $\lambda_c$. As from the previous equation for $\lambda_c$, $\Delta\lambda_c$ is proportional to $\Delta D$, where $\Delta D$ is the change in spatial period of the spatially periodic perturbation. Using a grating material having a coefficient of thermal expansion much larger than that of the single mode fiber, then the thermal conditions being monitored are found as a direct mathematical function of $\Delta\lambda_c$.

Figure 18:
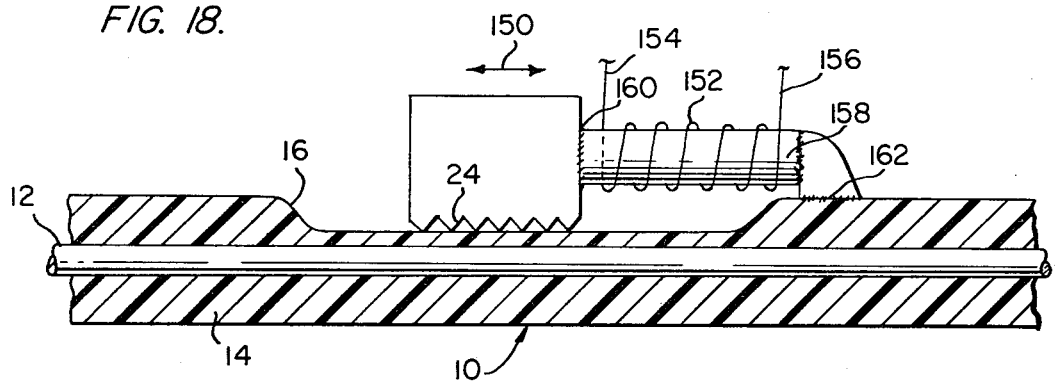
FIG. 18 illustrates the application of the present invention wherein the grating is moved by a coil.

Referring to FIG. 18, the single mode fiber 10 consisting of the core 12 and cladding 14 is provided with the usual ground zone 16. Within the zone 16 is mounted a grating 24, the grating 24 is caused to move in the direction of the arrow 150 by an electrical coil 152 having leads 154 and 156. The coil creates a magnet field about the core 158 of magnetostrictive material. The core is cemented as at 160 to the grating and at the opposite end as at 162 to the cladding 14. It will be recognized by those skilled in the art that the coil 152 is not needed when the unit is used to measure magnetic fields.

Figure 19:
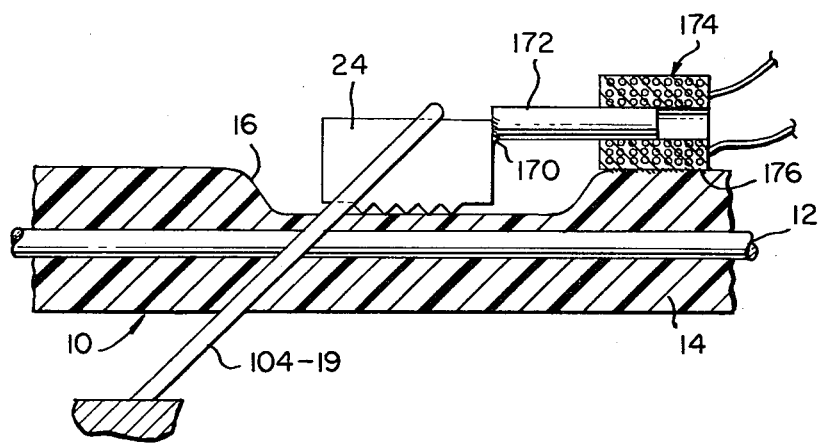
FIG. 19 is like FIG. 18 wherein the coil is the immovable element of a solenoid.

Referring now to FIG. 19, the single mode fiber 10 is provided with the ground zone 16 in its cladding 14, and in this zone is mounted the optical grating 24. The mounting includes a quartz fiber or spider 104-19 as disclosed in reference to FIGS. 13 and 14. One end of the grating 24 is cemented as at 170 to a core 172 movable within solenoid coil 174 cemented as at 176 to the fiber cladding 14.

Figure 20:
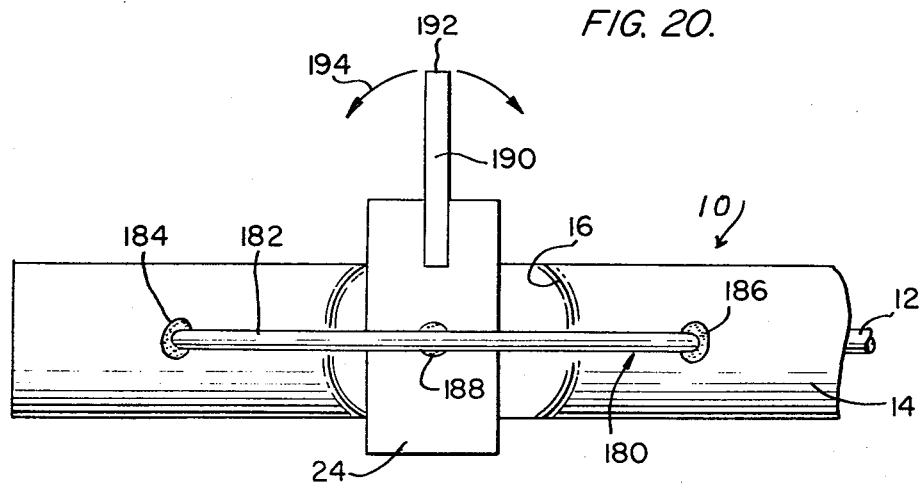
FIG. 20 illustrates a form of the invention wherein the grating is angularly displaced.

Now referring to FIG. 20, the optical fiber 10 having a cladding 14 is provided with a ground zone 16 within which the optical grating 24 is mounted. The mounting means 180 includes a thin fiber 182 cemented as at 184 and 186 to the external surface of the cladding 14. Between the ends of the fiber 182 is positioned the grating 24 and maintained in the desired position by cement 188. Also cemented to the top surface of the grating 24 is an arm 190, the free end 192 of which is connected to, for example, the movable element of the solenoid shown in FIG. 19 or movable sail 118 illustrated in FIGS. 15 and 16. Motion of the arm 190 adjacent its end 192 is shown by directional arrow 194. This motion shown by arrow 194 is a rotation about the normal to the geometric plane containing the grating. As previously described, such a rotation modulates the center frequency of the grating reflector. In such cases, also as previously mentioned, the optical fiber may be multimode provided optical coherence is maintained over the length of the grating.

It is finally understood that for any low frequency or static conditions the gratings position can be coupled to any body whose length or size relates to the particular conditions to be measured, such as animal membranes as affected by changes in humidity.

In all cases of measurement such a system, which moves a periodic perturbation in a glass fiber, allows the measurement of low level signals in the presence of high electric and magnetic fields and noise, as in the case of eeg, ekg signals.

In cases where the distance between the sensor grating and the data gathering instrumentation in great, as in towed acoustic arrays, the invention provides for the actual assembly of an optical demodulation stage inside the fiber by placing two gratings having the same spatial period on the fiber and separating them by a distance as measured along the length of the fiber. The invention couples the relative position of the two gratings to the particular condition to be monitored. A spectral analysis of the light reflected by such an arrangement reveals a series of resonant peaks very much like those of a Fabry Perot interferometer. Location or motion of these peaks within the spectrum is a direct indication of the condition being monitored.

In cases where many separate conditions are to be monitored, the invention provides for both frequency and time multiplexing. The invention injects the fiber with multiline laser light as from an iodine laser as reported by R. L. Byer et al in *Applied Physics Letters;* Vol. 20 No. 11; June, 1972, or a turnable dye laser. Each grating, or in the case employing the optical demodulation system, each pair of gratings are constructed so as to reflect a different laser wavelength line. Each grating or pair so formed can be coupled to a different parameter to be measured. A spectral analysis of the reflected light will reveal several frequency regions each corresponding to a different grating or pair of gratings. The invention further causes the input laser light to be pulsed. Since each grating or pair of gratings is located at a different distance, along the fiber as measured from the laser, the reflected light from each grating or pair of gratings will arrive back at the analyzing instrumentation at different times. Correlating return time to distance traveled by the laser pulse allows each return pulse to be identified with a particular grating or pair of gratings and therefore each return pulse will again indicate a separate monitored condition.

We claim:

1. Means for modulating radiant energy in a single mode clad optical fiber comprising:

a single mode optical fiber having a modulation control zone where the cladding is partially removed or formed with a decreased thickness relative to the remainder of the cladding;

an optical grating;

means for mounting the optical grating in the control zone with the crests of the optical grating positioned generally normal to the optical axis of the fiber; and means for sliding the optical grating relative to the optical fiber to cause a narrow band of the radiant electromagnetic energy in the optical fiber to be modulated in phase and/or frequency.

2. The invention defined in claim 1 wherein the means for displacing the optical grating longitudinally with respect to the optic axis of the optical fiber comprises a shear mode piezoelectric transducer.

3. The invention defined in claim 1 wherein the crests and troughs of the grating are caused by the crests and troughs of an acoustic surface wave.

4. The invention defined in claim 1 wherein the means for displacing the optical grating longitudinally with respect to the optic axis of the optical fiber comprises a longitudinal mode piezoelectric transducer.

5. The invention defined in claim 4 wherein one end of the longitudinal mode transducer is bonded to the optical fiber.

6. The invention defined in claim 4 wherein the grating is an integral part of the longitudinal mode transducer.

7. Means for modulating radiant energy in a single mode clad optical fiber comprising:

a single mode optical fiber having a modulation control zone where the cladding is partially removed or formed with a decreased thickness relative to the remainder of the cladding;

an optical grating;

means for mounting the optical grating in the control zone with the crests of the optical grating positioned generally normal to the optical axis of the fiber; and means for sliding the optical grating relative to the optical fiber to cause a narrow band of the radiant electromagnetic energy in the optical fiber to be modulated in phase and/or frequency, where the means for displacing the optical grating longitudinally with respect to the optic axis of the optical fiber comprises a shear mode piezoelectric transducer, and wherein the piezoelectric transducer has the grating formed in one surface.

8. The invention defined in claim 7 wherein the grating is metallized and forms one of the electrodes for the transducer.

9. Means for modulating radiant energy in a single mode clad optical fiber comprising:
   a single mode optical fiber having a modulation control zone where the cladding is partially removed or formed with a decreased thickness relative to the remainder of the cladding;
   an optical grating;
   means for mounting the optical grating in the control zone with the crests of the optical grating positioned generally normal to the optical axis of the fiber; and
   means for sliding the optical grating relative to the optical fiber to cause a narrow band of the radiant electromagnetic energy in the optical fiber to be modulated in phase and/or frequency,
wherein the grating is rotated about the normal to the geometric plane containing the grating in proportion to an input signal.

10. Means for modulating radiant energy in a single mode clad optical fiber comprising:
   a single mode optical fiber having a modulation control zone where the cladding is partially removed or formed with a decreased thickness relative to the remainder of the cladding;
   an optical grating;
   means for mounting the optical grating in the control zone with the crests of the optical grating positioned generally normal to the optical axis of the fiber; and
   means for sliding the optical grating relative to the optical fiber to cause a narrow band of the radiant electromagnetic energy in the optical fiber to be modulated in phase and/or frequency,
wherein the means for longitudinally displacing the grating is a microphone diaphragm attached to the grating.

11. Means for modulating radiant energy in a single mode clad optical fiber comprising:
   a single mode optical fiber having a modulation control zone where the cladding is partially removed or formed with a decreased thickness relative to the remainder of the cladding;
   an optical grating;
   means for mounting the optical grating in the control zone with the crests of the optical grating positioned generally normal to the optical axis of the fiber; and
   means for sliding the optical grating relative to the optical fiber to cause a narrow band of the radiant electromagnetic energy in the optical fiber to be modulated in phase and/or frequency,
wherein the means for longitudinally displacing the optical grating is a hydroacoustic antenna attached to the grating and optical fiber.

12. Means for modulating radiant energy in a single mode clad optical fiber comprising:
   a single mode optical fiber having a modulation control zone where the cladding is partially removed or formed with a decreased thickness relative to the remainder of the cladding;
   an optical grating;
   means for mounting the optical grating in the control zone with the crests of the optical grating positioned generally normal to the optical axis of the fiber; and
   means for sliding the optical grating relative to the optical fiber to cause a narrow band of the radiant electromagnetic energy in the optical fiber to be modulated in phase and/or frequency,
wherein the means for longitudinally displacing the optical grating is a temperature sensitive material.

13. The invention defined in claim 12 comprising a tube which longitudinally expands and contracts when heated or cooled.

14. Means for modulating radiant energy in a single mode clad optical fiber comprising:
   a single mode optical fiber having a modulation control zone where the cladding is partially removed or formed with a decreased thickness relative to the remainder of the cladding;
   an optical grating;
   means for mounting the optical grating in the control zone with the crests of the optical grating positioned generally normal to the optical axis of the fiber; and
   means for sliding the optical grating relative to the optical fiber to cause a narrow band of the radiant electromagnetic energy in the optical fiber to be modulated in phase and/or frequency,
wherein a thin fiber is used to maintain the grating in close contact with the optical fiber.

15. Means for modulating radiant energy in a single mode clad optical fiber comprising:
   a single mode optical fiber having a modulation control zone where the cladding is partially removed or formed with a decreased thickness relative to the remainder of the cladding;
   an optical grating;
   means for mounting the optical grating in the control zone with the crests of the optical grating positioned generally normal to the optical axis of the fiber; and
   means for sliding the optical grating relative to the optical fiber to cause a narrow band of the radiant electromagnetic energy in the optical fiber to be modulated in phase and/or frequency,
wherein the means for moving the grating is a magnetostrictive material.

16. Means for modulating radiant energy in a single mode clad optical fiber comprising:
   a single mode optical fiber having a modulation control zone where the cladding is partially removed or formed with a decreased thickness relative to the remainder of the cladding;
   an optical grating;
   means for mounting the optical grating in the control zone with the crests of the optical grating positioned generally normal to the optical axis of the fiber; and
   means for sliding the optical grating relative to the optical fiber to cause a narrow band of the radiant electromagnetic energy in the optical fiber to be modulated in phase and/or frequency,
wherein the means for moving the rating is an electric solenoid and a moving core.

17. Means for modulating radiant energy in a single mode clad optical fiber comprising:
   a single mode optical fiber having a modulation control zone where the cladding is partially removed or formed with a decreased thickness relative to the remainder of the cladding;

an optical grating;

means for mounting the optical grating in the control zone with the crests of the optical grating positioned generally normal to the optical axis of the fiber; and means for sliding the optical grating relative to the optical fiber to cause a narrow band of the radiant electromagnetic energy in the optical fiber to be modulated in phase and/or frequency, wherein the grating is rotated about the normal to the geometric plane containing the grating so as to cause the grating to reflect a particular wavelength band or electromagnetic radiant energy.

18. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber.

19. The method defined in claim 18 wherein longitudinal displacement of the grating relative to the optic axis of the fiber is carried out by directing an electrical signal to a longitudinal mode piezoelectric transducer.

20. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber, wherein longitudinal displacement of the grating relative to the optic axis of the fiber is carried out by directing an electrical signal to a shear mode transducer.

21. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber, wherein longitudinal displacement of the grating relative to the logitudinal axis of the fiber is carried out by directing an electrical signal to a piezoelectric element.

22. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber, wherein longitudinal displacement of the grating relative to the optic axis of the fiber is carried out by attaching the grating to the diaphragm of a microphone.

23. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber, wherein longitudinal displacement of the grating relative to the longitudinal axis of the fiber is carried out by attaching the grating to a movable element of a hydroacoustic antenna.

24. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber, wherein longitudinal displacement of the grating relative to the longitudinal axis of the fiber is carried out by securing the grating to a thermally expandable or contractible element.

25. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber, wherein the grating is rotated in proportion to an input signal or parameter.

26. A method of frequency and/or phase modulating radiant energy in a single mode fiber wherein the grating is formed by the crests and troughs of an acoustic surface wave formed in a piezo or ferro electric material placed near the single mode fiber core.

27. A method of claim 26 wherein the frequency of the acoustic surface wave is coupled to an input signal or parameter.

28. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating generally normal to the optic axis of the optical fiber, and causing sliding of the grating relative to the optic axis of the fiber, wherein longitudinal displacement of the grating relative to the optic axis of the fiber is carried out by directing an electrical signal to a longitudinal mode piezoelectric transducer; and wherein a magnetostrictive material is substituted for the longitudinal mode piezoelectric transducer.

29. A method of modulating radiant electromagnetic energy in phase and/or frequency in a single mode optical fiber comprising:

removing a portion of the cladding from a single mode optical fiber having a cladding about the fiber;

mounting an optical grating on said fiber in the zone where the portion of the cladding has been removed with the crests of the grating oriented generally normal to the optic axis of the optical fiber, and causing sliding of the grating relative to the optic axis of the fiber, wherein longitudinal displacement of the grating relative to the optic axis of the fiber is carried out by directing an electrical signal to a longitudinal mode piezoelectric transducer, and wherein an electric solenoid and movable core are substituted for the longitudinal mode piezoelectric material.

30. Means for modulating radiant energy in a single mode clad optical fiber comprising:

a single mode optical fiber having a modulation control zone;

an optical grating;

means for mounting the optical grating in the control zone with the crests of the optical grating positioned generally normal to the optical axis of the fiber; and means for sliding the optical grating relative to the optical fiber to cause a narrow band of the radiant electromagnetic energy in the optical fiber to be modulated in phase and/or frequency.

31. A method of modulating radiant electromagnetic energy in phase and/or frequency in a single mode optical fiber having a control zone comprising:

mounting an optical grating on said fiber in the zone with the crests of the grating oriented generally normal to the optic axis of the optical fiber, and causing sliding of the grating relative to the optic axis of the fiber.

* * * * *